No. 659,253. Patented Oct. 9, 1900.
J. H. F. OTTO.
TELLURIAN.
(Application filed Jan. 20, 1900.)
(No Model.) 4 Sheets—Sheet 2.
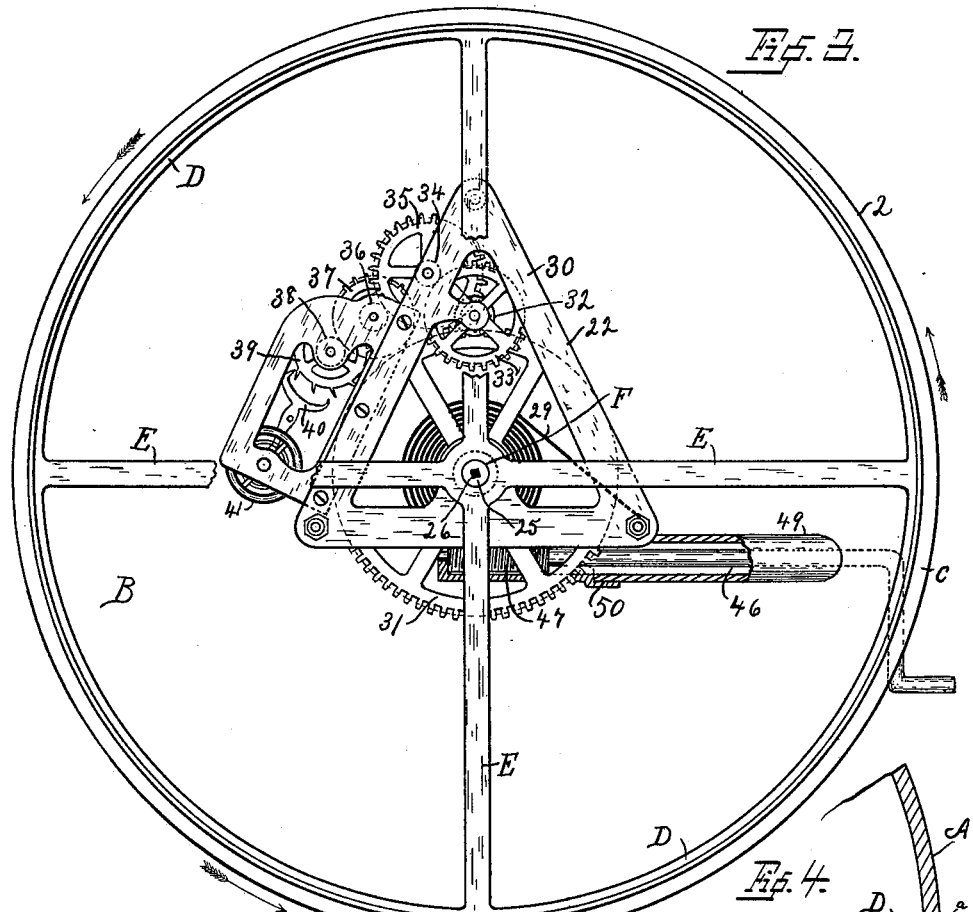
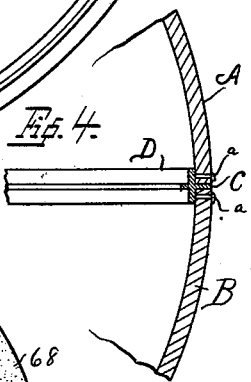
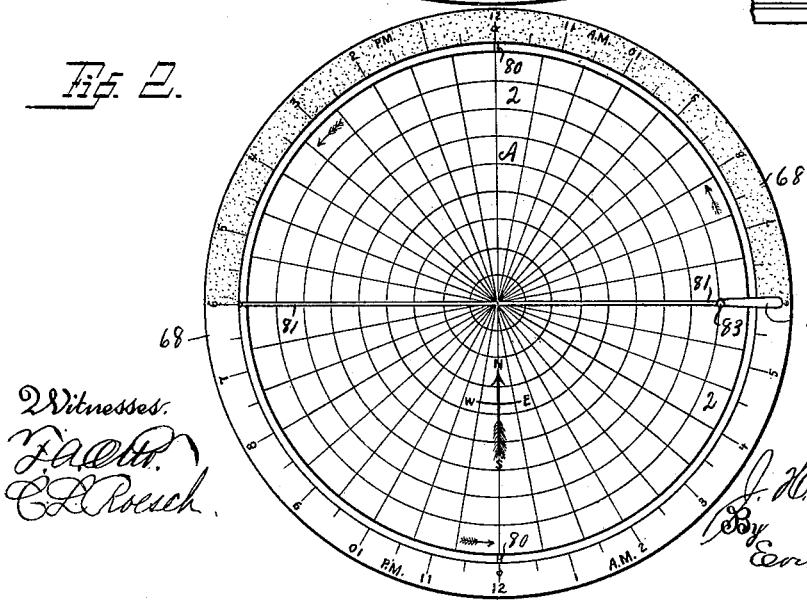
Witnesses Inventor
J. H. Ferdinand Otto
By Corwin & Wheeler
Attorneys No. 659,253. Patented Oct. 9, 1900.
J. H. F. OTTO.
TELLURIAN.
(Application filed Jan. 20, 1900.)
(No Model.) 4 Sheets—Sheet 3.
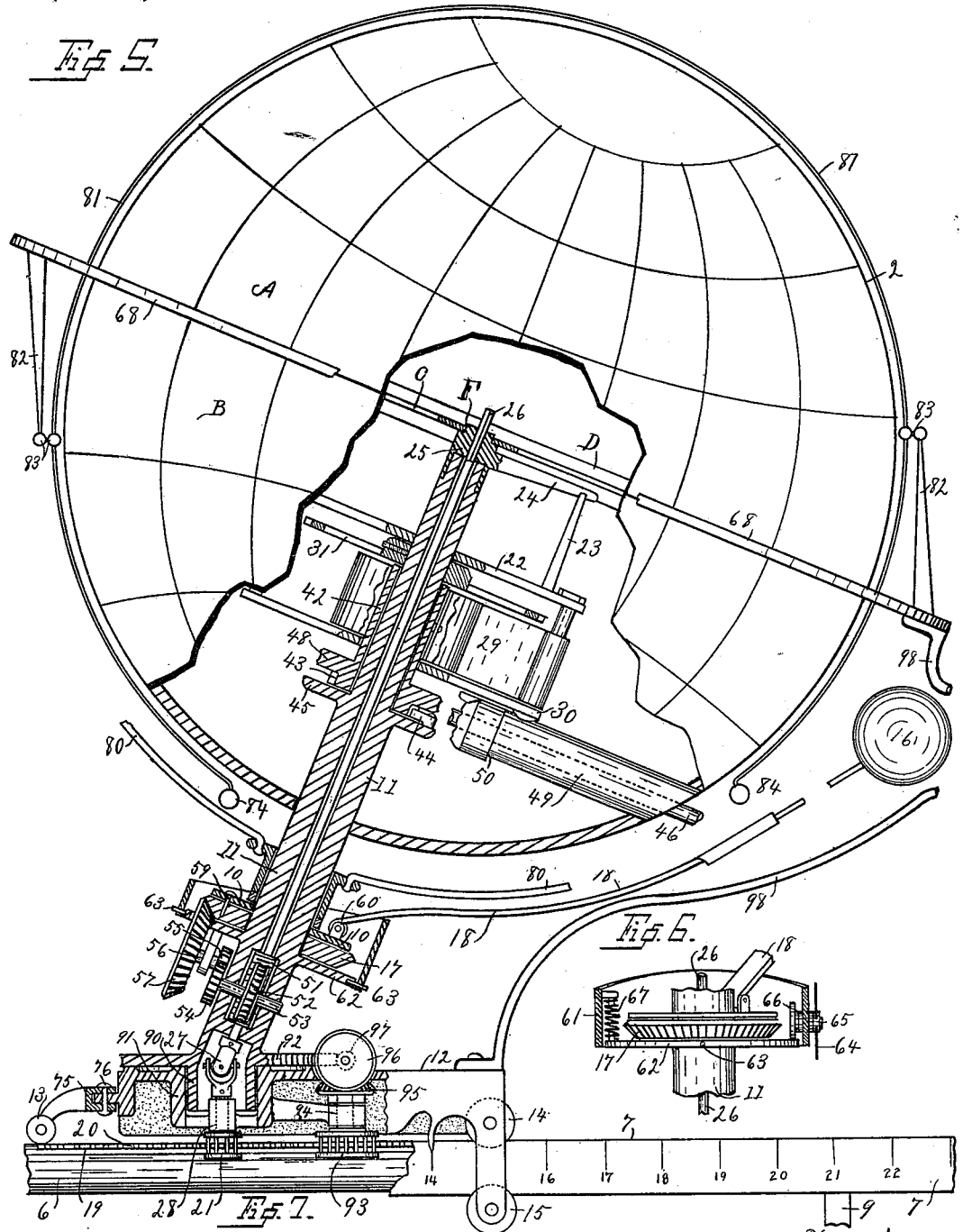
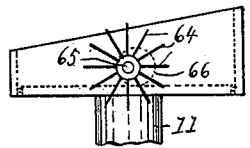

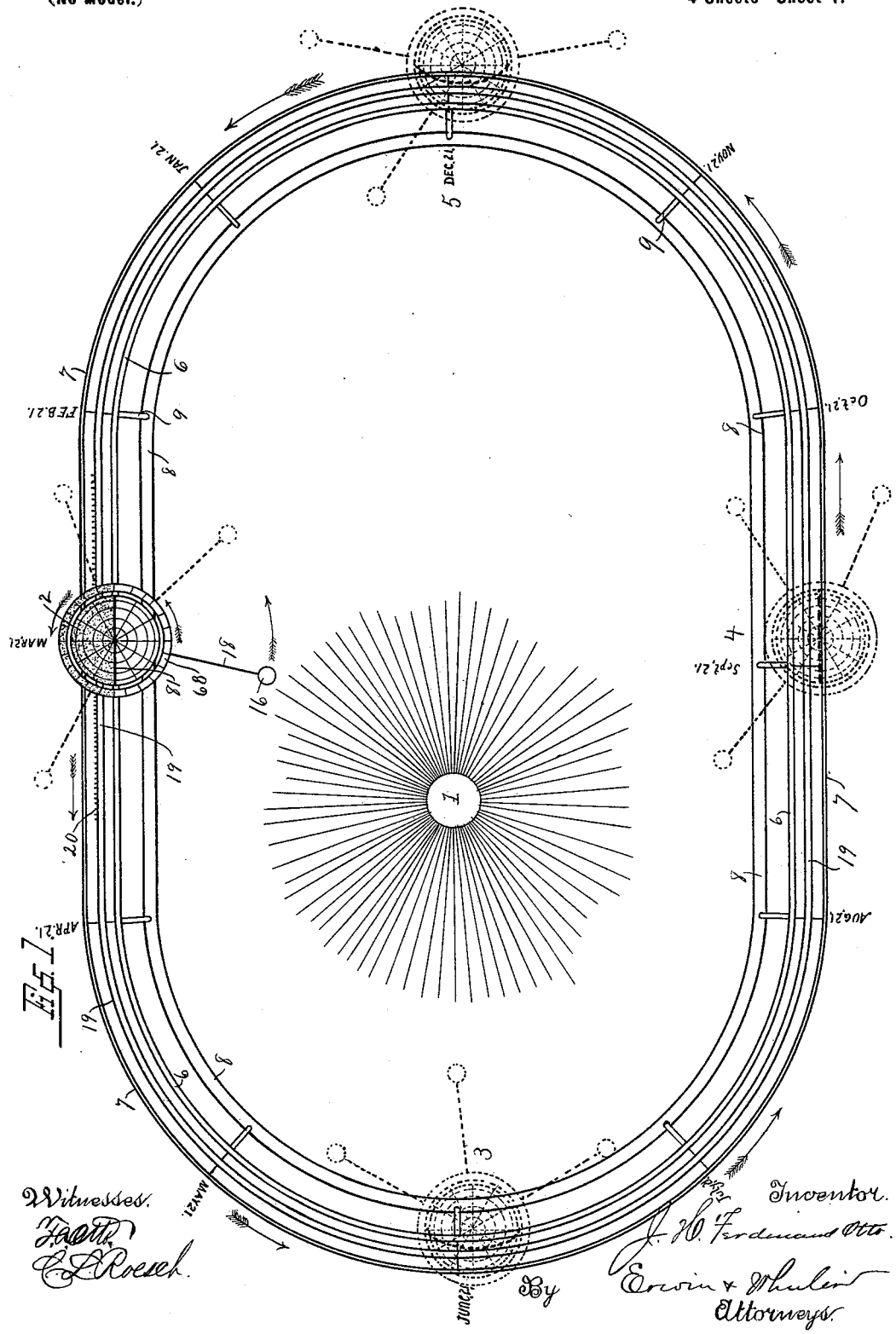

No. 659,253. Patented Oct. 9, 1900.
J. H. F. OTTO.
TELLURIAN.
(Application filed Jan. 20, 1900.)
(No Model.) 4 Sheets—Sheet 4.
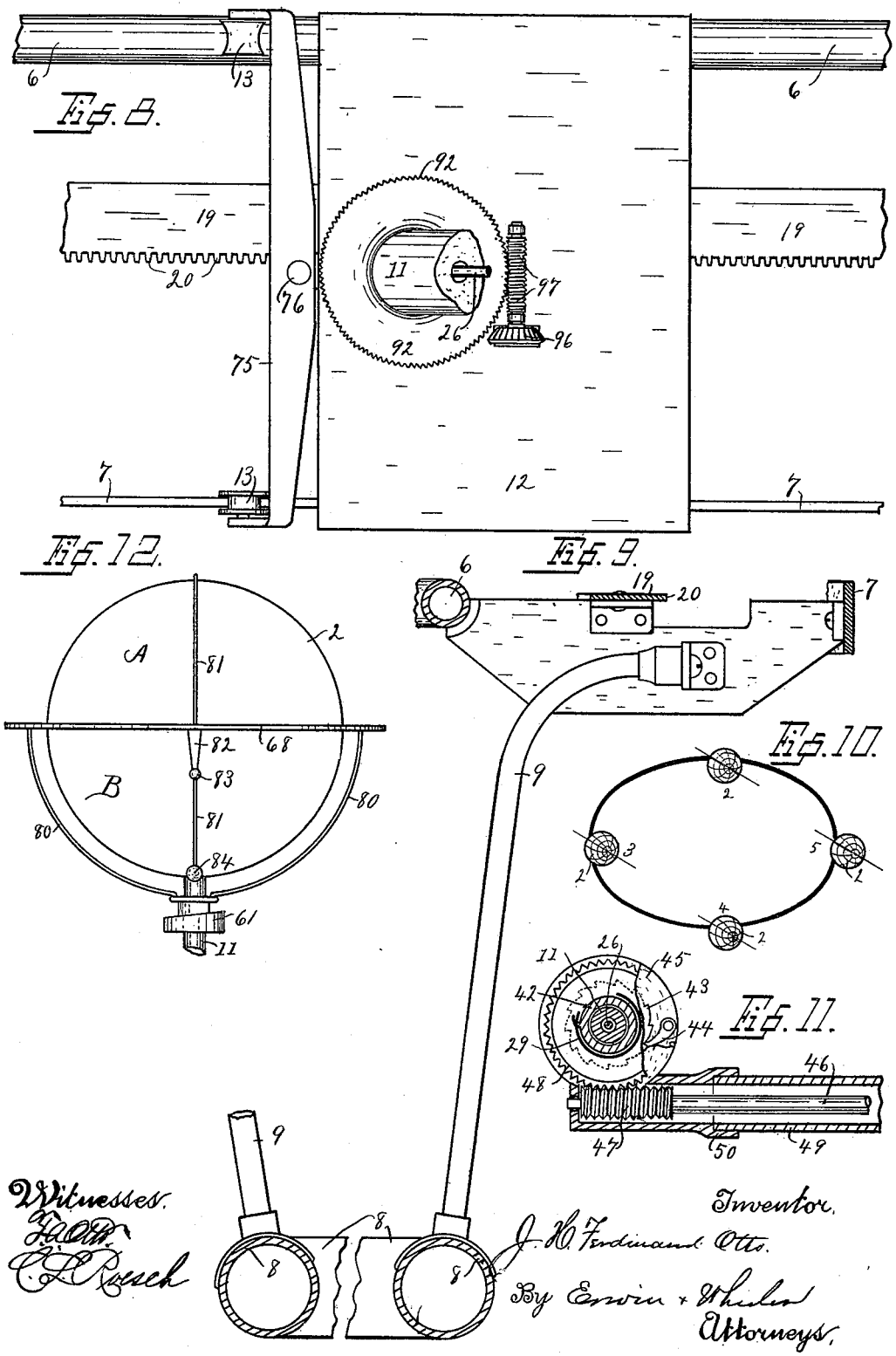

UNITED STATES PATENT OFFICE.

JOHN H. FERDINAND OTTO, OF MILWAUKEE, WISCONSIN.

TELLURIAN.

SPECIFICATION forming part of Letters Patent No. 659,253, dated October 9, 1900.

Application filed January 20, 1900. Serial No. 2,191. (No model.)

*To all whom it may concern:*

Be it known that I, JOHN HENRY FERDINAND OTTO, a citizen of the United States, residing at Milwaukee, in the county of Milwaukee and State of Wisconsin, have invented new and useful Improvements in Tellurians, of which the following is a specification.

The object of my invention is to provide an apparatus for the purpose of illustrating to the eye the real and apparent movements of the earth, exhibiting the ellipticity of the earth's orbit, the position of the sun, the inclination of the pole to the plane of the ecliptic, and the constancy of the pole during the entire yearly revolution, the phenomena of eclipses, day and night, sunrise and sunset, and the seasons, the varying declination of the sun, the equation of time, and the motions and phases of the moon.

My invention is further explained by reference to the accompanying drawings, in which—

Figure 1 represents a plan view of the tellurian, in which the relative position of the earth and its orbit to the sun is illustrated, also the relative position of the moon to the earth at several points in its orbit around the sun. Fig. 2 represents a top view of the earth. Fig. 3 represents the interior view of the lower half of the globe drawn at right angles to the earth's axis, in which is shown a clock mechanism, by which the tellurian is driven. Fig. 4 is a detail showing the manner of uniting the lower half of the globe shown in Fig. 3 to the upper half. Fig. 5 represents a side view of the globe representing the earth, part broken away to show the interior driving mechanism, the supporting-standard, and carriage upon which such parts are supported from the track, a portion of the track which forms the annular orbit around the sun, the driving mechanism for both rotating the earth upon its axis and propelling it upon such track, and the mechanism for communicating the monthly movement to the moon. Fig. 6 is a detail of the moon-actuating device. Fig. 7 is an exterior view of the device shown in Fig. 6. Fig. 8 represents a top view, and Fig. 9 represents a cross-section, of the track upon which the earth is supported, which track represents the yearly orbit of the earth around the sun. The carriage and part of the mechanism for propelling the earth along said track are also shown in Fig. 8. Fig. 10 represents the earth at four points in its orbit and also indicates the angle of the earth's axis to the plane of the ecliptic. Fig. 11 represents the winding mechanism of the driving-gear. Fig. 12 is a side view of the globe, drawn at right angles to that shown in Fig. 5, illustrating the manner of supporting the annular ring which surrounds the globe at the equator and the parts connected therewith.

Like parts are identified by the same reference characters throughout the several views.

Referring to Fig. 1, 1 represents the sun.

2 represents the earth, which is indicated by dotted lines at the different positions—3, 4, and 5—in its annular orbit around the sun.

6 and 7 are the rails of a track upon which the earth is supported in its annular orbit. The tracks 6 and 7 are in turn supported from the annular tube 8 by the radial arms 9. The globe 2, representing the earth, is supported upon the track from the standard 11 and the carriage 12. The carriage 12 is provided with supporting-wheels 13 and 14 and retaining-roller 15, which retaining-roller engages upon the under side of the track to prevent the carriage from becoming disengaged therefrom.

16 represents the moon, which is supported from the standard 11 through the disk 10, bevel-gear 17, and rod 18.

19 is a central track, the upper side of which is provided with a series of teeth or a rack-bar 20, in which the driving-pinion 21 operates to propel the carriage around the track. Motion is communicated to the pinion 21 from the clock-gear 22 through the arms 23 and 24, collar 25, shaft 26, universal joint 27, and shaft 28, whereby the pinion 21, which is affixed to the shaft 28, is caused to rotate along said central track 19, whereby the carriage is caused to move around the orbit described by the tracks 6 and 7.

The clock-gear 22 consists of the following elements: Main driving-spring 29, supporting-frame 30, chain of gears 31, 32, 33, 34, 35, 36, 37, and 38, escapement-wheel 39, escapement-lever 40, and balance-wheel 41. The outer end of said spring 29 is secured to one of the posts of the supporting-frame 30, while its inner end is secured to the sleeve 42. 43 is a ratchet-wheel, which is rigidly secured to said sleeve and turns with it as the driving-spring 29 is wound up. 44 is a pawl, which is pivoted to a stationary collar 45, projecting from the supporting-standard 11, while the free end of said pawl engages the teeth of said ratchet 43. When desirous to wind up said driving-spring 29, a rotating movement is communicated to the sleeve 42 from the winding-shaft 46 through the worm 47 and worm-gear 48, the worm-gear 48 being rigidly affixed to said sleeve. When the spring 29 has been thus wound, the worm 47 and winding-shaft 46 are removed by turning said worm-shaft 46 backward until the worm is disengaged from the worm-gear, when the clock-gear 22 is in condition to be operated. The gear 31 is rigidly affixed to the supporting-standard 11 and remains at rest, while the other members of said chain of gears, together with the escapement and balance wheel, are supported from and moved with the frame 30, whereby said frame and the globe and other parts connected therewith are caused to rotate around said supporting-standard 11. The supporting-frame 30 is rigidly affixed to the globe 2, which represents the earth, and the movement of said gears is regulated so as to cause said globe to perform one revolution on its axis once in twenty-four hours, thereby representing the daily rotation of the earth on its axis.

The winding-shaft 46 is supported at its inner end from the gear-supporting frame 30 and at its outer end by the walls of the globe through the inclosing shell 49, all of which parts rotate conjointly together. To provide for rotating the globe representing the earth independently of the clock-gear, the supporting-shell 49 is preferably made in two parts, which are telescoped together, as indicated at 50, whereby it is obvious that by removing the winding-shaft and the outer end of said supporting-shell 49 the globe may be rotated on its axis independently of the driving-gear. When, however, the telescoping parts of said supporting-sleeve are coupled together, as indicated in Fig. 3, said globe is rotated only as it is driven by said driving-gear.

I have thus far described the action of the driving mechanism so far as it pertains to the daily and yearly movements of the earth.

Motion is communicated to the sphere 16, which represents the moon, from the shaft 26 through the worm 51, worm-gear 52, shaft 53, gears 54 55, shaft 56, bevel-gears 57 and 17, disk 10, and locking-pin 59. The driving-gears, which are actuated by the shaft 26, are so proportioned in relation to each other as to cause the sphere representing the moon to perform one revolution around the globe representing the earth once while said globe performs thirty revolutions on its axis, thus representing the monthly revolution of the moon around the earth. If desirous to rotate the moon around the earth independently of said driving mechanism, the locking-pin 59 is removed from the disk 10, when said disk, with the moon and moon-supporting rod, are free to be moved independently by the operator.

The moon-supporting rod 18 is connected with the disk 10 by the pivotal joint 60, which permits the free end of said rod to move upwardly and downwardly, as required, to permit the alternate ascent and descent of the moon to illustrate its changes of declension. This movement is effected through the encircling sleeve 61, which is secured to the stationary flange 62 upon the opposing pivots 63 63, upon which pivots it is oscillated from time to time with each revolution of the supporting-rod 18 around the earth. Motion is communicated from said moon-supporting rod 18 to said encircling sleeve 61 with each revolution of said rod 18 through the star-wheel 64, shaft 65, eccentric 66, and the spiral spring 67, as follows: With each revolution of the rod 18 around the earth it is brought in contact with one of the arms of said star-wheel 64, whereby said star-wheel is rotated one-sixth of a revolution, thereby actuating said eccentric 66, whereby as the eccentric presses downwardly upon said flange 62 one side of said encircling sleeve 61 is raised and the opposite side is lowered, said sleeve being oscillated upon its pivotal support 63. Thus it is obvious that said encircling sleeve 61 will be gradually tilted farther and farther with each movement of the star-wheel, until the eccentric 66 reaches its lowest point, when by the further rotation of said eccentric said sleeve will be tilted in the opposite direction, it being held in contact with the surface of said eccentric by the recoil of the spring 67. Thus it is obvious that in view of the fact that said moon-supporting rod 18 rests of its own gravity upon the edge of said oscillating sleeve said rod will be caused to rise and fall as said sleeve is oscillated, and thus describe the required circles to represent the alternate ascent and descent of the moon and its changes of declension.

68 is an annular index-plate, which surrounds the globe at its equator and is supported at right angles to its axis from the standard 11 by the arms 80. The index-plate 68 is subdivided into twenty-four equal spaces by index-lines and figures from "1" to "12," representing the twenty-four hours of the day, and as this index remains stationary while the globe revolves beneath it the figures at such index indicate the hours of the day at any point upon the globe at any given time. These hour-spaces may be again subdivided, as desired, into spaces indicating the half, quarter, or any other fraction of an hour.

The outside surface of the exterior track 7 is subdivided into three hundred and sixty-five equal spaces, indicating the days of the year from January 1 to December 31. These spaces may be again subdivided into equal spaces indicating the twelve months of the year, and the spaces indicating the days of each month are numbered to correspond with the days of the month from "1" to "31," as shown in Fig. 5.

While the angles of the earth's axis to the plane of the carriage-supporting track, which represents the orbit of the earth around the sun, remains substantially constant at about twenty-three degrees, the inclination of the earth's axis toward and from the sun is changed at different points of such orbit. For example, when the earth is at that point in its orbit indicated at "December 21" in Fig. 1 the north pole of the earth's axis is farthest from the sun and when it has reached that point indicated at "June 21" it is inclined toward the sun, and the position of the earth's axis between such extreme points is gradually changed from one to the other as the earth passes around its orbit, it being at intermediate points at "March 21" and at "September 21." This change of inclination of the earth's axis is brought about by turning the standard 11 upon the carriage 12 one complete revolution on its longitudinal axis with each revolution of the earth and its supporting-carriage around its annular orbit. To produce such annular rotation of the earth and its supporting-standard, said standard is provided with a vertical sleeve 90, which is fitted so as to revolve in an inclosing collar 91, formed therefor in said carriage 12. The standard 11 is also provided with a worm-wheel 92, which is rigidly affixed thereto and rotates with it. Motion is communicated to said worm-wheel and standard, the globe, and other parts supported therefrom from the toothed bar 20 through the lantern-wheel 93, shaft 94, beveled gears 95 96, and worm-shaft 97, said connecting gears and mechanism being so timed and proportioned that the earth and earth-supporting standard will revolve one three hundred and sixty-fifth of a revolution with each daily revolution of the earth on its axis, whereby the earth's axis will remain constant toward the polar star regardless of the turning of the supporting-carriage upon the track.

To facilitate the movement of the earth-supporting carriage upon its tracks, the rear end of the carriage is preferably supported from its center by the bar 75, which bar is secured to said carriage by the pivotal bolt 76, said pivotal bolt forming a joint which permits the respective ends of said bar 75 to move backwardly and forwardly to conform to the curvature of the track without interfering with the proper movement of said carriage along the track and without throwing the pinions of the carriage out of engagement with the rack-bar of the track. The rear end of the carriage is supported on wheels 13. To facilitate inserting the driving mechanism of my apparatus in the globe, the same is formed of two separable parts A and B, which are joined together at C on a line corresponding with the equator, the contiguous edges of such parts being secured to the annular ring D, as indicated in Fig. 4, by the pins a. The upper edge of the lower half of the globe is provided with a supporting bracket or spider E, the outer arms of which are connected with said annular ring D, while the center is provided with an aperture F for the reception of the collar 25, which rotates upon the upper end of the supporting-standard 11. It is obvious that by this arrangement the clock mechanism, being kept wound and properly regulated, the earth will be caused thereby to rotate upon its axis once in twenty-four hours, the moon will be caused to revolve around the earth once in twenty-nine and one-half or thirty days, with the proper ascending and descending movements, while the earth and moon together will be caused to pass around the sun once in three hundred and sixty-five days, while the earth's axis will be caused to assume its proper inclination toward and from the sun, corresponding substantially to the actual movements of such planets during the year.

81 is a circular rod which is supported from the annular ring 68 by the arms 82 82 and the pivotal bearings 83 83, said pivotal bearings 83 being located on a line parallel with the supporting-track, while the lower ends of said circular rod 81 are provided with weights 84 84, located below said pivotal bearings, whereby said rod is retained in the vertical position at right angles to the equator by the gravity of said weights. The object of said circular rod is to cast a shadow upon the earth's surface and make the line of demarkation between night and day more distinct than it would otherwise be, presuming the light to be thrown upon the globe from the point 1 in Fig. 1, it being obvious that by locating a lamp at such point the light-and-shade effect of the sun upon the globe indicating the earth will be clearly illustrated. The further object of said rod 81 is to more clearly indicate the inclination of the earth upon its axis toward and from the sun at different points in its annular orbit. To prevent the annular ring 68 and the other parts suspended therefrom from turning with the earth or the earth-supporting standard, which parts have their independent rotary movements beneath such ring, the same is connected with the carriage 12 through the arm 98 or other suitable means, whereby it is retained in the same relative position to the carriage.

It is obvious that, if desired, the driving-spring and spring-actuated clock-gear in the globe may be dispensed with and all the other operating parts actuated by simply pushing the globe-supporting carriage around upon its supporting-track, in which event the desired movement of the earth and moon will be communicated to such parts from the rack-bar 19.

I am aware that a globe representing the earth in a tellurian has previously been actuated from a common central point of a true circle around a globe representing the sun. By my improvement, however, owing to the fact that the operating mechanism is located in the globe itself and has no mechanical connection with the central point around which it revolves, it is free to move in an elliptical course corresponding with the actual movement of the earth in its orbit around the sun.

Having thus described my invention, what I claim as new, and desire to secure by Letters Patent, is—

1. In a tellurian, the combination of a globe representing the earth; a globe representing the sun; a circular track representing the earth's elliptical orbit around the sun; a carriage mounted upon said circular track; a revoluble standard supporting said globe from said track; a rack-bar supported by said track, parallel with the plane of movement of said carriage; a rack-pinion having journal-bearings in said carriage and operating in said rack-bar; a spring-actuated clock-gear located in said globe; and means for communicating motion from said clock-gear in said globe to said rack-pinion; and from said rack-bar back to said globe, whereby said carriage and globe are driven around and upon said elliptical track regardless of its varying distance from the globe representing the sun, while the earth is rotated upon its own axis and such axis is retained at the proper inclination to the plane of the track, substantially as and for the purpose specified.

2. In a tellurian, the combination of a globe representing the earth; a track representing the elliptical orbit around the sun; a carriage mounted upon said track; a revoluble standard supporting said globe from said carriage; a rack-bar supported by said track, parallel with the plane of movement of said carriage; a rack-pinion having journal-bearings in said carriage and operating in said rack-bar; a spring-actuated clock-gear located in said globe; a hollow standard supporting said globe from said carriage; a shaft communicating from the driving mechanism in said globe through said standard to the driving mechanism of said carriage; a sphere representing the moon, supported by a revoluble disk from said standard; and means for communicating motion from said standard to said revoluble disk, whereby the sphere, representing the moon, will be actuated by the rotation of said shaft and said carriage simultaneously driven upon said track; and means for communicating motion back from said rack-bar to said revoluble standard, substantially as and for the purpose specified.

3. In a tellurian, the combination of a globe representing the earth; a circular track representing the earth's orbit around the sun; a carriage mounted upon said circular track from which said globe is revolubly supported; a rack-bar supported by said track, parallel with the plane of movement of said carriage; a rack-pinion having journal-bearings in said carriage and operating in said rack-bar; a spring-actuated clock-gear located in said globe; a hollow standard supporting said globe from said carriage; a shaft communicating from the driving mechanism in said globe through said standard to the driving mechanism of said carriage; a sphere representing the moon, supported by a revoluble disk from said standard; means for communicating motion from said standard to said revoluble disk, whereby the sphere representing the moon will be actuated by the rotation of said shaft and said carriage simultaneously driven upon said track; a pivotal joint connecting the moon-supporting rod with said revoluble disk; an encircling sleeve pivotally supported at opposite sides to a flange projecting from said standard; and means for tilting said encircling sleeve upon its pivotal support, from time to time, with each revolution of the sphere representing the moon, around the earth, substantially as and for the purpose specified.

4. In a tellurian, the combination of a revoluble globe representing the earth; a circular track representing the earth's orbit; a globe-supporting standard revolubly supported from said carriage; a rack-bar supported by said track, parallel with the plane of movement of said carriage; a rack-pinion having journal-bearings in said carriage and operating in said rack-bar; a revoluble shaft communicating from the driving mechanism in said revoluble globe through said standard, to the driving mechanism of said carriage; a sphere representing the moon, revolubly supported from said globe-supporting standard; means for communicating motion from said revoluble shaft to the sphere representing the moon; and means for communicating motion from said rack-bar to said globe-supporting standard and globe, whereby the spheres representing the earth and moon may be actuated from the rack-bar of said carriage-supporting track, independently of the driving clock-gear, substantially as and for the purpose specified.

5. In a tellurian, the combination of a globe representing the earth; an annular dial-plate surrounding said globe on its equator, pivotally supported from the globe-supporting standard, and provided with index marks or characters representing the daily and hourly movements of the earth upon its axis; a circular track representing the earth's orbit around the sun; a carriage mounted upon said circular track, from which said globe is revolubly supported; a rack-bar supported by said track, parallel with the plane of movement of said carriage; a rack-pinion having journal-bearings in said carriage and operating in said rack-bar; a spring-actuated clock-gear located in said globe; a hollow standard supporting said globe from said carriage; a shaft communicating from the spring-actuated clock-gear in said globe through said standard, to the driving mechanism of said carriage; a sphere representing the moon, supported by a revoluble disk from said standard; and means for communicating motion from said standard to said revoluble disk, whereby the globe, representing the moon, will be actuated by the rotation of said shaft and said carriage simultaneously driven upon said track, substantially as and for the purpose specified.

6. In a tellurian, the combination of a globe representing the earth; an annular dial-plate surrounding said globe on its equator, pivotally supported from the globe-supporting standard, and provided with index marks or characters representing the daily and hourly movements of the earth upon its axis; a circular track representing the earth's orbit around the sun; an index-plate located upon said globe-supporting track, representing the monthly and daily subdivisions of time of the annular movement of the earth in its orbit around the sun; a carriage mounted upon said circular track, from which said globe is revolubly supported; a rack-bar supported by said track parallel with the plane of movement of said carriage; a rack-pinion having journal-bearings in said carriage and operating in said rack-bar; a spring-actuated clock-gear located in said globe; a hollow standard supporting said globe from said carriage; a shaft communicating from the spring-actuated clock-gear in said globe through said standard to the driving mechanism of said carriage; a sphere representing the moon, supported by a revoluble disk from said standard; and means for communicating motion from said standard to said revoluble disk, whereby the sphere representing the moon will be actuated by the rotation of said shaft, and said carriage simultaneously driven upon said track, substantially as and for the purpose specified.

In testimony whereof I affix my signature in the presence of two witnesses.

J. H. FERDINAND OTTO.

Witnesses:
HERM. J. HUCKE,
JOHN MAHKORN.